H. P. SCHREIBER.
SECONDARY BATTERY.
APPLICATION FILED JULY 13, 1909.

962,263.

Patented June 21, 1910.

WITNESSES

INVENTOR
Hugo Paul Schreiber
BY
ATTORNEYS

UNITED STATES PATENT OFFICE.

HUGO PAUL SCHREIBER, OF LONDON, ENGLAND.

SECONDARY BATTERY.

962,263.  Specification of Letters Patent.  Patented June 21, 1910.

Application filed July 13, 1909. Serial No. 507,291.

*To all whom it may concern:*

Be it known that I, HUGO PAUL SCHREIBER, a subject of the German Emperor, and residing at No. 35 Grosvenor Mews, New Bond street, London, W., England, have invented a certain new and useful Improved Secondary Battery, of which the following is a specification.

My invention relates to secondary batteries and has for its object the construction of a cell which is more efficient and lasting than those as heretofore constructed.

My invention consists in constructing a secondary battery in which the positive electrode consists of a lead or lead alloy tube pasted inside with any known suitable paste containing lead and its oxids. The negative electrode consists of a smaller tube of lead pasted outside with metallic lead paste, which is placed concentrically in the positive electrode, the electrodes and layer of paste being of such form and dimensions that the charging of the cell causes the paste on the negative electrode to contract and bind very firmly on to the tubular electrode while the charging also causes the active material on the positive electrode to expand and bind firmly against the inner side of the electrode.

The invention also consists in the provision in such batteries of passages in the electrodes and active material, so constructed as to allow unchecked circulation of the electrolyte through and around the cell and at the same time prevent the washing off and escape of the active material through such passages.

The invention further consists in mounting a battery of the type indicated upon an insulating block or socket of such a form as to prevent short circuits through loose particles of active material.

Figure 1:
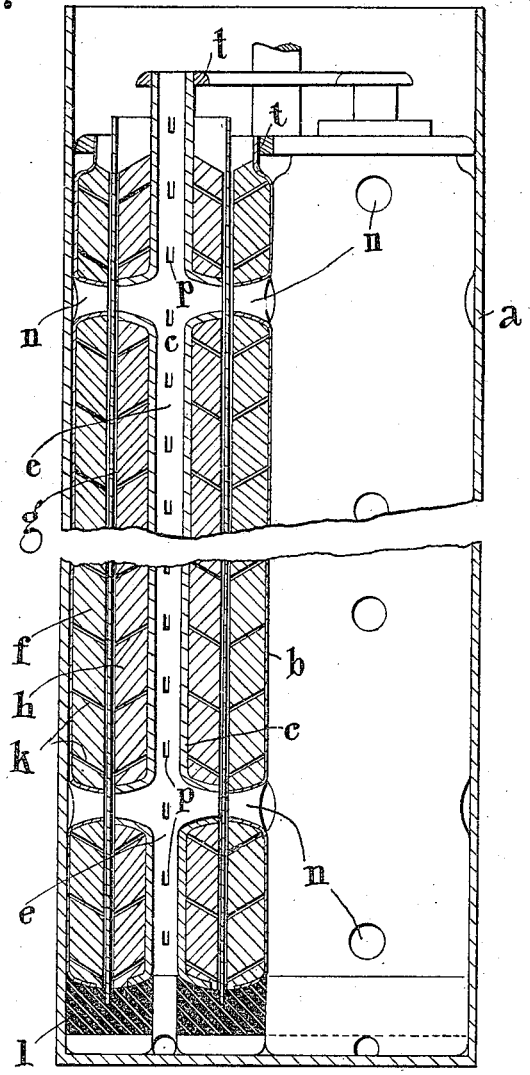
Figure 2:
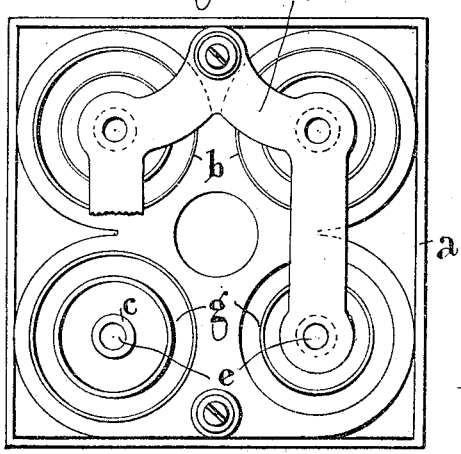

Referring to the accompanying drawings; Figure 1 is a sectional side view of a battery containing four units, while Fig. 2 is a plan of the same.

In carrying my invention into effect according to the form illustrated, I employ a casing, $a$, composed of any suitable acid resisting material, in which any number of units may be placed according to the power required. Each unit is composed of an outer tube of lead, $b$, pasted inside with a paste of lead oxids, $f$, and an inner tube of lead, $c$, pasted with metallic lead, $h$. In the space between the two layers of paste is placed a cylindrical layer of spongy wood, $g$, which may be prepared by any known method.

The electrolyte—sulfuric acid—is filled into the casing, $a$, and surrounds the units, penetrating to the spaces, $e$, inside the tube, $c$, and to the space between the two layers of paste, through the passages, $n$; both the inner and outer tubes may be provided at intervals with perforations, $p$, and the paste with channels, $k$, to allow the electrolyte free access to all parts of the paste and also to allow the escape of gases produced in charging.

The passages, $n$, are formed either by punching the metal of the tubes or by welding on pieces of tube of suitable diameter so that the edges of the metal forming the ends of these passages are close to the layer of spongy wood $g$, thus preventing any escape of paste.

Suitable terminals $t$, are provided above the units of both tubes. Each unit rests upon a base, $l$, of any suitable insulating material into which the bottom of the spongy wood cylinder, $g$, fits tightly; this construction forms an absolute separation between the two electrodes. It is impossible however much paste may become loose and settle at the bottom of the cell for it to create a short circuit by connecting the two electrodes. The base $l$, is also provided with channels to allow free passage of the electrolyte from the inside to the outside of the unit.

In this form of battery the tubes are small both in diameter and thickness compared with the thickness of the layer of paste upon them. This formation overcomes a great difficulty usually met with in accumulators of the lead grid type, namely, that during charging the paste on the positive electrode increases in volume while that on the negative electrode decreases in volume causing buckling of the plates and breaking up of the paste. In the above described form of battery the expansion of the paste on the positive electrode tends to bind the paste firmly into contact with the inside of the tube and the contraction of the paste on the negative electrode similarly tends to bind the paste more firmly on to the outside of the negative tube, in consequence, internal resistance caused by imperfect electrical contact between the electrodes and the paste is reduced to a minimum, and the paste being firmly bound on to the electrodes is rendered less likely to break up than in batteries as heretofore constructed.

In the ordinary type of lead grid accumulator, whatever the shape of the electrodes may be, considerable loss in charging takes place owing to the current passing directly from one lead support to the other owing to the surfaces of the pasted plates being sulfated to a greater or less degree.

In the form of battery I have described the metal of the tubes forming the supports for the paste is placed so that they are in no way exposed to such action of the electrolyte.

Having now described my invention what I claim as new and desire to secure by Letters Patent is:—

1. In secondary electric batteries in combination an external electrode in the form of a cylindrical leaden tube, a layer of active material inside said tube, a cylindrical porous division inside said active material, an internal electrode in the form of a cylindrical leaden tube inside said porous division, a layer of active material surrounding said inner leaden tube, a liquid electrolyte and passages through said layers of active material lined with the metal of the electrodes, as set forth.

2. In secondary electric batteries in combination an external electrode in the form of a cylindrical leaden tube, a layer of active material inside said tube, a cylindrical porous division inside said active material, an internal electrode in the form of a cylindrical leaden tube inside said porous division, a layer of active material surrounding said inner leaden tube, an insulating base in contact with one end of said porous division, a liquid electrolyte and passages through said layers of active material lined with the metal of the electrodes, as set forth.

3. In secondary electric batteries in combination an external electrode in the form of a cylindrical leaden tube, a layer of active material inside said tube, a cylindrical porous division inside said active material, an internal electrode in the form of a cylindrical leaden tube inside said porous division, a layer of active material surrounding said inner leaden tube, an insulating base provided with a circular groove receiving one end of said porous division, a liquid electrolyte and passages through said layers of active material lined with the metal of the electrodes, as set forth.

4. In secondary electric batteries in combination an external electrode in the form of a cylindrical leaden tube, a layer of active material inside said tube, a cylindrical porous division inside said active material, an internal electrode in the form of a cylindrical leaden tube inside said porous division, a layer of active material surrounding said inner leaden tube, an insulating base provided with a circular groove receiving one end of said porous division, a liquid electrolyte, passages through said base for the circulation of said electrolyte and passages through said layers of active material lined with the metal of the electrodes, as set forth.

5. In secondary electric batteries in combination an external electrode in the form of a cylindrical leaden tube, a layer of active material inside said tube, a cylindrical porous division inside said active material, an internal electrode in the form of a cylindrical leaden tube inside said porous division, a layer of active material surrounding said inner leaden tube, both layers of active material being of thickness equal to the diameter of said inner leaden tube and passages through said active material lined with the metal of the electrodes, as set forth.

In testimony whereof I have hereunto signed by name in the presence of two subscribing witnesses.

HUGO PAUL SCHREIBER.

Witnesses:
A. A. KRAUS,
F. A. OUTHWAITE.